UNITED STATES PATENT OFFICE.

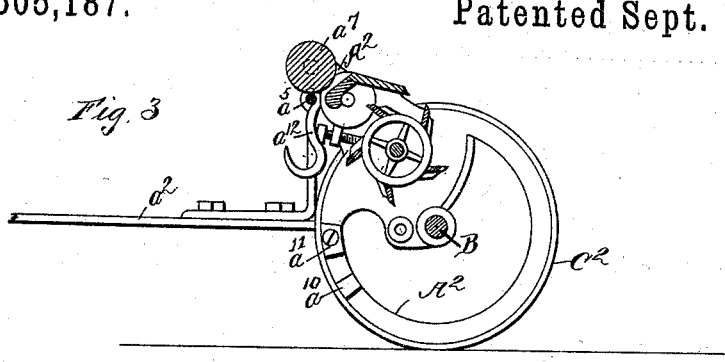
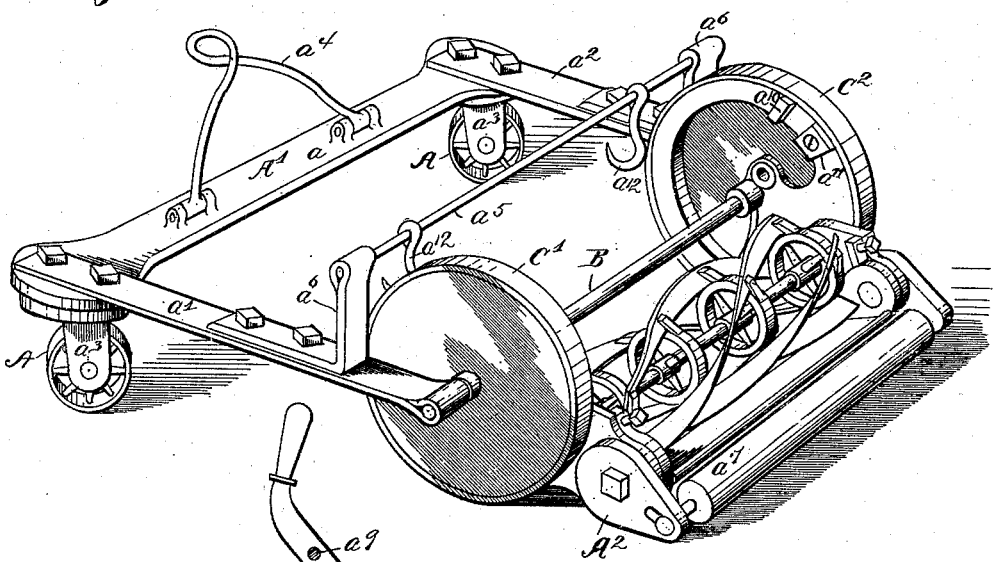
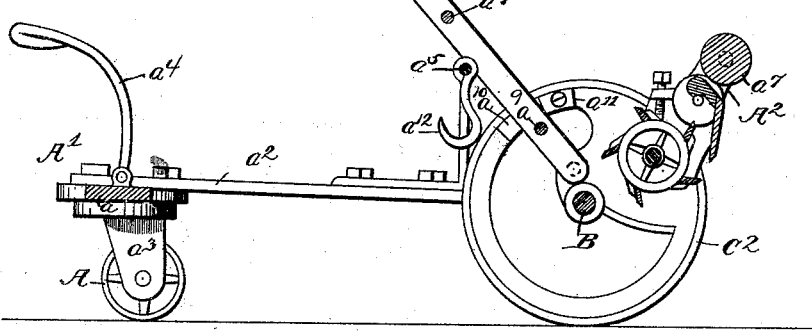

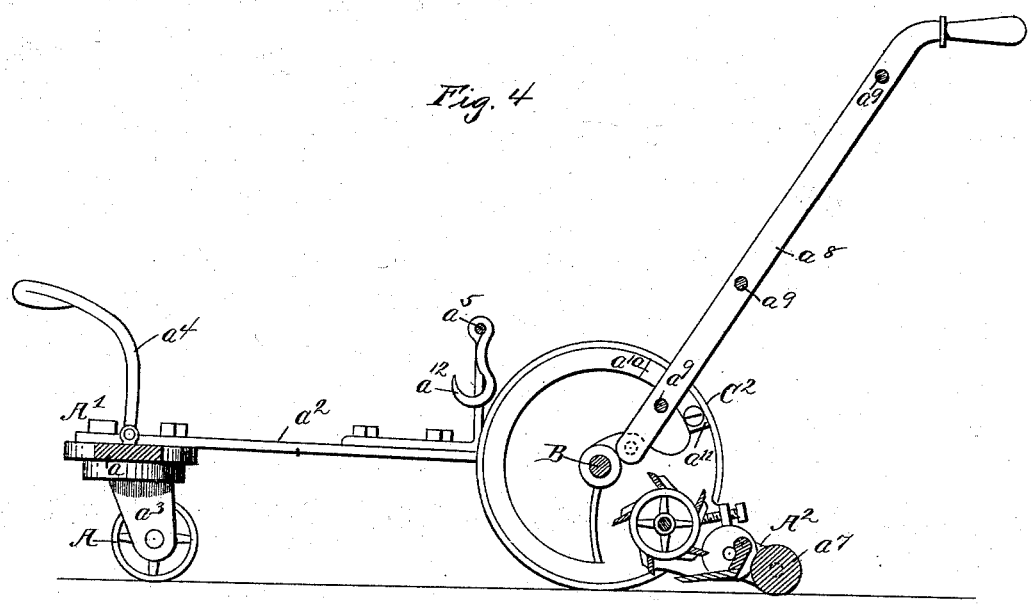

GEORGE W. CARR, OF BROOKLYN, NEW YORK.

LAWN-MOWER.

SPECIFICATION forming part of Letters Patent No. 505,187, dated September 19, 1893.

Application filed December 8, 1890. Serial No. 373,886. (No model.)

*To all whom it may concern:*

Be it known that I, GEORGE W. CARR, of Brooklyn, Kings county, and State of New York, have invented a certain new and useful Improvement in Lawn-Mowers, of which the following is a specification.

I will describe a lawn mower embodying my improvement and then point out the novel features in the claims.

In the accompanying drawings, Figure 1 is a perspective view of a lawn mower embodying my improvement. Fig. 2 is a central longitudinal section thereof showing parts raised to a position which they may occupy when out of use. Fig. 3 is a central longitudinal section showing parts raised in another position which they may occupy when out of use. Fig. 4 is a central longitudinal section showing the parts in position for use.

Similar letters of reference designate corresponding parts in all the figures.

This machine consists essentially of two frames $A'$ $A^2$, pivotally connected to a common support, here shown as consisting of an axle B, connected with wheels, $C'$ $C^2$. The wheels $C'$ $C^2$ are intended to transmit motion to the cutting apparatus, and therefore have their peripheries so constructed as to insure their rotation when the machine is moved over the ground and both of them rotate around the axle B.

The frame $A'$ as here shown, consists of two parallel side pieces $a'$ $a^2$ secured at their rear end to the ends of the axle B so as to be sustained thereby and connected together at the forward ends by a cross piece $a$. The forward part of this frame is sustained by wheels A, which will preferably be made in the form of caster wheels or, in other words, connected with the frame $A'$ so as to be capable of swiveling. As here shown, their axles are journaled in frames $a^3$ having a swiveling connection with the frame $A'$.

The draft device is intended to be fastened to the frame $A'$. As here shown, it consists of a clevis or loop $a^4$ fastened to the forward part of the frame $A'$ and constructed to receive a hook or pin whereby a whiffletree or analogous device may be connected to it.

The frame $A'$ comprises a rod $a^5$ which, as here shown, is elevated considerably above it and sustained by standards $a^6$ erected upon the side pieces $a'$ $a^2$ of said frame.

The frame $A^2$ sustains the cutters and the gearing through which motion is transmitted to them from the driving wheel or wheels. This frame has side pieces which are fitted to the axle B, so that the forward part of the frame will be supported by said axle. At the rear, the frame is provided with a roller $a^7$, which travels over the ground and sustains the rear portion of said frame.

It will be seen that the frames $A'$ $A^2$ are connected together by the axle, and that either may rise and fall without affecting the other.

Preferably I combine with the frame $A^2$ a pair of hand rods, whereby the machine may be guided. I have shown hand rods $a^8$, connected together by cross rods $a^9$ fastened at their lower extremities to the side pieces of the frame $A^2$. They may be fastened to the side pieces by having the outer sides of their lower ends provided with pins and the inner surfaces of the side pieces of the frame $A^2$ provided with corresponding sockets. When this means of connection is adopted, the hand rods will have to be sprung laterally inward to permit of the engagement of the pins with the sockets, and similarly manipulated to effect the disengagement of the pins from the sockets. Some of the cross rods will have to be removed or loosened to permit of thus springing the hand rods.

To enable the hand rods to also serve as a means for elevating the rear portion of the frame $A^2$, I preferably provide the side pieces of the frame $A^2$ with lugs $a^{10}$ $a^{11}$ separated a sufficient distance to enable them to embrace the said rods. One of the lugs, $a^{11}$, may be made separate from the side pieces of the frame $A^2$ and secured thereto by screws. The lugs $a^{10}$ $a^{11}$ preclude any oscillating movement of the hand rods without a corresponding movement of the frame $A^2$. Hence the hand rods may be swung forward as represented in Fig. 2, to elevate the rear portion of the frame $A^2$, and when this is done, the side rods can rest against the rod $a^5$ to sustain the frame $A^2$ in this position. If the hand rods are not used and it is desired to sustain the rear portion of the frame $A^2$ in an elevated position, the rear portion of the frame can be swung forward to rest against the rod $a^5$, as shown in Fig. 3.

The rod $a^5$ may be provided with hooks $a^{12}$ for engaging with a part or appurtenance of the frame $A^2$, so as to retain the rear portion in an elevated position.

What I claim as my invention, and desire to secure by Letters Patent, is—

1. In a lawn mower, the combination of two independent frames arranged one rearward of the other the rear frame carrying cutter mechanism, a support common to the adjacent ends of both frames and rolling supports for the distant ends of said frames, substantially as specified.

2. In a lawn mower, the combination of a frame having wheels supporting its forward end, driving wheels rotating around an axle whereby the rear end of said frame is supported, a second frame carrying cutting mechanism and having its forward end connected to said axle and a rolling support for the rear end of said second frame, substantially as specified.

3. In a lawn mower, the combination of a frame having swiveling wheels supporting its forward end, driving wheels secured to an axle whereby the rear end of said frame is supported, a second frame carrying the cutter mechanism and having its forward end connected to said axle and a rolling support for the rear end of said second frame, substantially as specified.

4. In a lawn mower, the combination of two independent frames arranged one rearward of the other, driving wheels connected with an axle to which said frames also are connected and a rod and hook on the forward frame serving as a support for the rear frame when it is swung forward, substantially as specified.

5. In a lawn mower, the combination of two independent frames arranged one rearward of the other, driving wheels connected with an axle to which said frames also are connected, hand rods connected with the rear frame and a rod on the forward frame with which said hand rods may co-act to sustain the rear frame in an inoperative position, substantially as specified.

In testimony whereof I have signed my name to this specification in the presence of two subscribing witnesses.

GEO. W. CARR.

Witnesses:
C. R. FERGUSON,
S. O. EDMONDS.